United States Patent
Martins et al.

(10) Patent No.: US 6,480,632 B2
(45) Date of Patent: *Nov. 12, 2002

(54) METHOD AND APPARATUS TO INTERPOLATE VIDEO FRAMES

(75) Inventors: Fernando C. M. Martins, Hillsboro; Rajeeb Hazra, Beaverton, both of OR (US)

(73) Assignee: Intel Corporation, Santa Clara, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/205,638

(22) Filed: Dec. 3, 1998

(65) Prior Publication Data

US 2001/0024515 A1 Sep. 27, 2001

(51) Int. Cl.[7] .................................................. G06K 9/32
(52) U.S. Cl. ........................ 382/300; 345/606; 345/607; 348/700; 348/701
(58) Field of Search ................................ 382/300, 302, 382/276, 284; 348/451, 699, 700, 701; 358/428, 525; 345/606, 608, 723; 375/204.16

(56) References Cited

U.S. PATENT DOCUMENTS

| 5,208,872 | A | * | 5/1993 | Fisher et al. ................. 382/42 |
| 5,394,196 | A | * | 2/1995 | Robert ........................ 348/699 |
| 5,541,660 | A | * | 7/1996 | Kim et al. ................... 348/416 |
| 5,852,470 | A | * | 12/1998 | Kondo et al. ............... 348/448 |
| 5,949,919 | A | * | 9/1999 | Chen .......................... 382/276 |
| 5,986,635 | A | * | 11/1999 | Naka et al. ................. 345/127 |
| 5,991,464 | A | * | 11/1999 | Hus et al. ................... 382/300 |
| 6,008,865 | A | * | 12/1999 | Fogel .......................... 348/700 |
| 6,028,969 | A | * | 2/2000 | Gielow ....................... 382/300 |

OTHER PUBLICATIONS

Wong, Chi–Kong, et al., "Modified Motion Compensated Temporal Frame Interpolation For Very Low Bit Rate Video," IEEE, pp. 2327–2330 (1996).

Dudon, Marie, et al., "Triangle–Based Motion Estimation and Temporal Interpolation," IEEE Workshop on Nonlinear Signal & Image Processing, Greece (1995).

* cited by examiner

*Primary Examiner*—Bhavesh Mehta
*Assistant Examiner*—Yosef Kassa
(74) *Attorney, Agent, or Firm*—Blakely, Sokoloff, Taylor & Zafman LLP

(57) ABSTRACT

A method comprises, for a plurality of interpolated pixels in an interpolated video frame, classifying an interpolated pixel of the plurality as one of stationary, moving, covered, and uncovered, and then setting components of the interpolated pixel to components of a previous pixel from a previous video frame, the previous pixel corresponding to the interpolated pixel in the video frame. If the interpolated pixel is uncovered, components of the interpolated pixel are set to components of a current pixel from a current video frame if the interpolated pixel is uncovered, the current pixel corresponding to the interpolated pixel in the video frame. If the interpolated pixel is moving, the interpolated pixel is set to a function of the current pixel and the previous pixel.

40 Claims, 6 Drawing Sheets

METHOD AND APPARATUS TO INTERPOLATE VIDEO FRAMES

BACKGROUND

1. Field

The present invention relates to video technology and, more particularly, to video compression and/or decompression.

2. Background Information

Video information which is streamed over a network is typically composed of frames, which are rectangular arrays of pixels. With block-based streaming techniques, each frame is processed as a collection of pixel blocks, for example as 8×8 or 16×16 pixel blocks. These blocks are typically processed using a Discrete Cosine Transform (DCT), a block-based process.

Streaming video over a network employs a large amount of bandwidth; to conserve bandwidth, frames of the video stream may be dropped before the stream is transmitted. With some video streaming technologies, the frames which are transmitted may include reference frames, which are the full array of pixels for the frame, and delta frames, which represent only the pixels which are different between a reference frame and a subsequent frame, or between subsequent delta frames. It is then the responsibility of the receiver of the video stream to interpolate any dropped frames between reference frames.

One component of frame interpolation is motion estimation. An interpolated frame is created by interpolating the motion of objects that move between reference frames. Motion estimation is accomplished by computing a motion vector between the starting and ending position of each block of pixels in adjacent reference frames. Motion estimation in interpolated frames is accomplished by translating each block along its associated motion vector in proportion to the position of the interpolated frame between the reference frames. For example, if there are two interpolated frames between reference frames, for the first interpolated frame, each block in the first reference frame is translated one-third of the distance along its motion vector. For the second interpolated frame, each block in the first reference frame is translated two-thirds of the distance along its motion vector.

One problem with block-based motion estimation techniques is that they may result in uneven motion flow which does not represent the true motion of the objects in the video stream. Block-based motion estimation techniques often do not work well at low frame rates because too many interpolated frames are typically computed between reference frames. Block-based motion estimation involves translating the frame blocks along vectors, and often a fractional block move (less than the width or height of a block) is employed for correct interpolation, resulting in uneven blending of the moved blocks with the reference frame.

It would be desirable to interpolate video frames in a video stream without employing block-based motion estimation and without increasing the computational resources employed to perform the interpolation. It would be desirable if the interpolated video frames were computed with improved quality over existing techniques. It would be further desirable to extend the range of frame rates at which quality interpolated frames may be generated.

Interpolated frames often contain artifacts, that is, incorrectly computed pixels which do not blend well with the reference frames. Without detection of frames with significant artifacts, even a few badly interpolated frames may substantially decrease the quality of the video stream. If badly interpolated frames are detected, error concealment measures may be applied, reducing the perceived loss of quality. With conventional interpolation techniques using motion estimation, error detection on action sequences (sequences with more motion) employ greater computational resources than placid (low motion content) sequences. It would be desirable to detect erroneous interpolated frames in both action and placid video sequences with approximately equivalent computational resources.

SUMMARY

For a plurality of interpolated pixels in an interpolated video frame, an interpolated pixel of the plurality is classified as one of stationary, moving, covered, and uncovered. Components of the interpolated pixel are set to components of a previous pixel from a previous video frame, the previous pixel corresponding to the interpolated pixel in the video frame. If the interpolated pixel is uncovered, components of the interpolated pixel are set to components of a current pixel from a current video frame if the interpolated pixel is uncovered, the current pixel corresponding to the interpolated pixel in the video frame. If the interpolated pixel is moving, the interpolated pixel is set to a function of the current pixel and the previous pixel.

In another embodiment, the invention comprises classifying an interpolated pixel as stationary, moving, or uncovered. If the interpolated pixel is classified as moving, the interpolated pixel is set to a weighted sum of the corresponding pixel from a current video frame and the corresponding pixel from a previous video frame.

BRIEF DESCRIPTION OF THE DRAWINGS

The subject matter regarded as the invention is particularly pointed out and distinctly claimed in the concluding portion of the specification. The invention, however, both as to organization method of operation, together with objects, features, and advantages thereof, may be further understood by reference to the following detailed description when read with the accompanying drawings.

DETAILED DESCRIPTION

The present invention comprises an embodiment of a frame interpolator and/or components thereof, including methods and apparatus' that may be employed to implement a frame interpolator as described herein in more detail. The embodiments described herein enable a frame interpolator with several advantages over existing implementations. For example, some embodiments in accordance with the invention may be implemented without the use of motion estimation. The embodiments described herein are merely illustrative, and one skilled in the art will appreciate that numerous modifications may be made which nonetheless fall within the scope of the present invention.

One embodiment of a frame interpolator in accordance with the present invention may be implemented using a simple iterative loop which scans each pixel in an interpolated video frame and classifies the pixel according to four states: 1) stationary, 2) moving, 3) covered, and 4) uncovered. A value for each interpolated pixel may be generated by examining the state of each pixel. In one embodiment, by default the interpolated pixels may be set to the pixel values of the previous video frame. For stationary or covered pixels, no further processing may be employed. For uncovered pixels, the pixel value may be further set to the value of a corresponding pixel in the current frame. For moving pixels, the pixel value may be further set to a function of the pixel values in the current and previous frames.

Figure 1A:
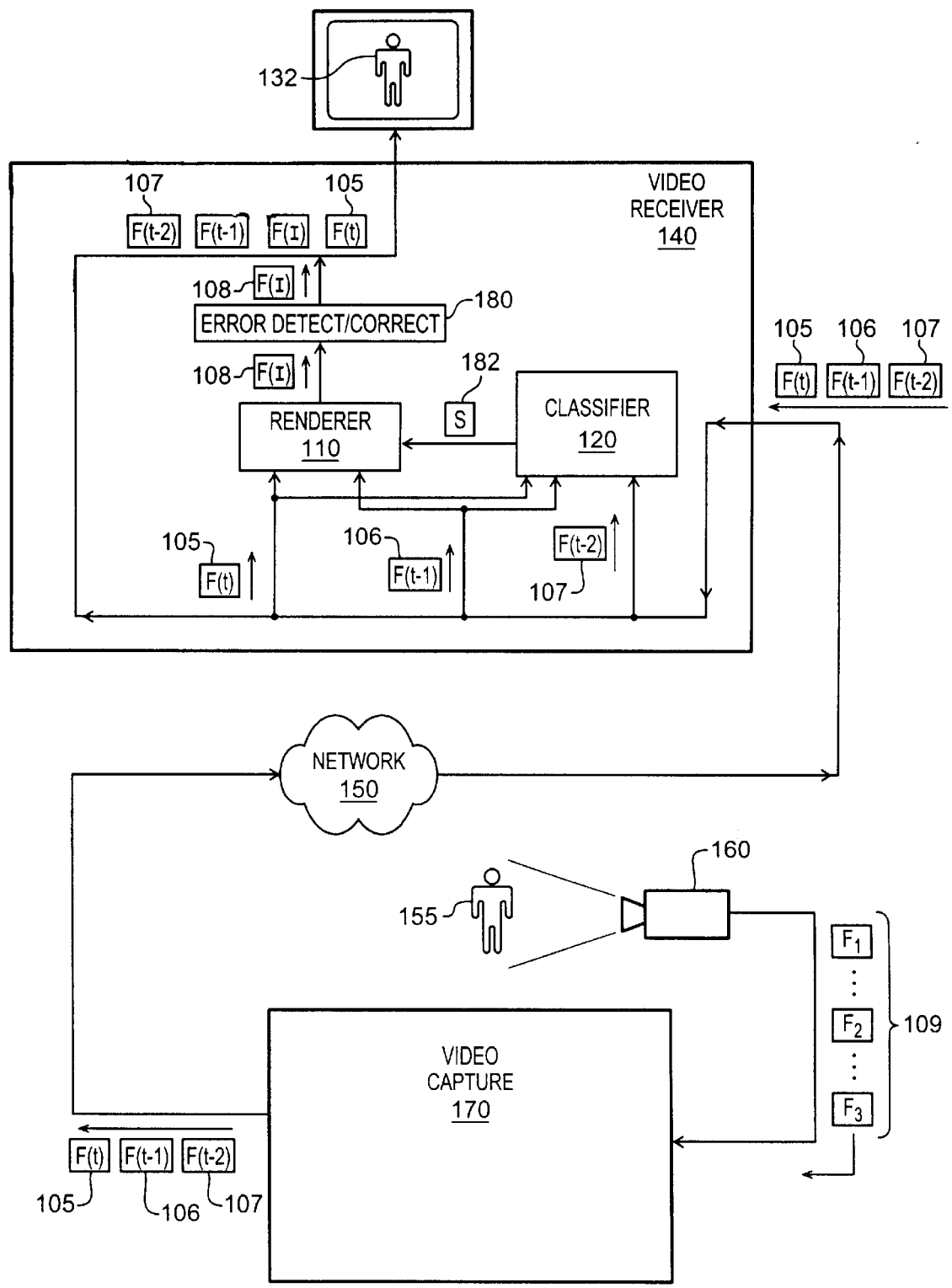
FIG. 1A is a schematic diagram illustrating an embodiment of a frame interpolator in accordance with the present invention.

FIG. 1A is a schematic diagram of a network system 100 illustrating an embodiment of a frame interpolator in accordance with the present invention. Of course, the invention is not limited in scope to this particular embodiment. Referring now to FIG. 1A, a video capture device 170 is coupled to a camera 160 or other video input peripheral to capture video information 155.

The captured video information is transferred to the video capture device 170 as a series of captured frames 104. The video capture device 170 processes the captured frames 104, typically to reduce the number of bits of information comprised by the captured frames 104. The processed captured frames are then transmitted over a network 150 to which the video capture device 170 is coupled, as a sequence of digital frames. In this example, at a given time t, three digital frames exist although clearly this is only one example and the invention is not limited in this regard. In this example the three frames comprise the current frame F(t) 105, captured at time t, a previous frame F(t-1) 106, captured at a previous time t-1, and another previous frame F(t-2) 107, captured at time t-2. For purposes of illustrating one embodiment of the invention, these three frames are sufficient, although one skilled in the art will appreciate that other frames may be present as well.

The frames 105–107 are transmitted over the network to a video receiver 140, at which point the frames are applied to different modules comprised by the video receiver 140. Frames F(t) 105, F(t-1) 106, and F(t-2) 107 are applied to classifier 120, and frames F(t) 105 and F(t-1) 106 are applied to renderer 110. The output signals of classifier 120 comprise a state map S 182 for an interpolated frame F(I) 108. This state map 182 is applied to renderer 110 to which classifier 120 is coupled. In one embodiment, the classifier 120, renderer 110, and error detector 180 may be implemented using sequences of software instructions executing on a microprocessor, as further illustrated in FIG. 3 below. In another embodiment, classifier 120, renderer 110, and error detector 180 may be implemented using hardware circuits. Therefore, the invention is not limited to hardware, software, or any combination hardware/software embodiment.

The state map 182 is comprised of entries which correspond in position to the pixels in interpolated frame 108. In one embodiment, the correspondence between pixels in frame 108 and entries in the state map 182 is a correspondence in position; an entry at row 10, column 5 in the state map 182 corresponds to the pixel at row 10, column 5 in the frame 108. One skilled in the art will appreciate that other correspondence schemes between pixels and entries in the state map are possible which do not necessarily rely on row and column numbers, such as, for example using a single index to reference a given pixel and entry.

In embodiment 100 each entry in the state map 182 is assigned a state value of MOVING, STATIONARY, COVERED, or UNCOVERED. The state value may be assigned to an entry according to a test which may be performed on the applied frames F(t) 105, F(t-1) 106, and F(t-2) 107, according to the following rules (although the invention is not limited in scope to this test embodiment):

STATIONARY: Identified components of corresponding pixels in F(t-2) 107, F(t-1) 106, and F(t) 105 have the same value in each frame.

MOVING: Identified components of corresponding pixels in F(t-2) 107, F(t-1) 106, and F(t) 105 have a different value in each frame.

COVERED: Identified components of corresponding pixels in F(t-2) 107, F(t-1) 106 have the same value in each frame; value of identified components of corresponding pixel in F(t) 105 have a different value.

UNCOVERED: Identified components of corresponding pixels in F(t-1) 106, F(t) 105 have the same value in each frame; value of identified components of corresponding pixel in F(t-2) 107 have a different value.

The STATIONARY state corresponds to the situation in which a pixel had the same value in each of the three frames, indicating a pixel which is not moving.

The MOVING state corresponds to the situation in which a pixel had a different value in each of the three frames, indicating a pixel in motion.

The UNCOVERED state corresponds to the situation in which a pixel was covered by another pixel in frame F(t-2) 107 and the covering pixel was removed in frame F(t-1) 106.

The COVERED state corresponds to the situation in which a pixel was uncovered (not covered by another pixel in frame F(t-2) 107 and another pixel covered the pixel in frame F(t-1) 106.

Figure 2A:
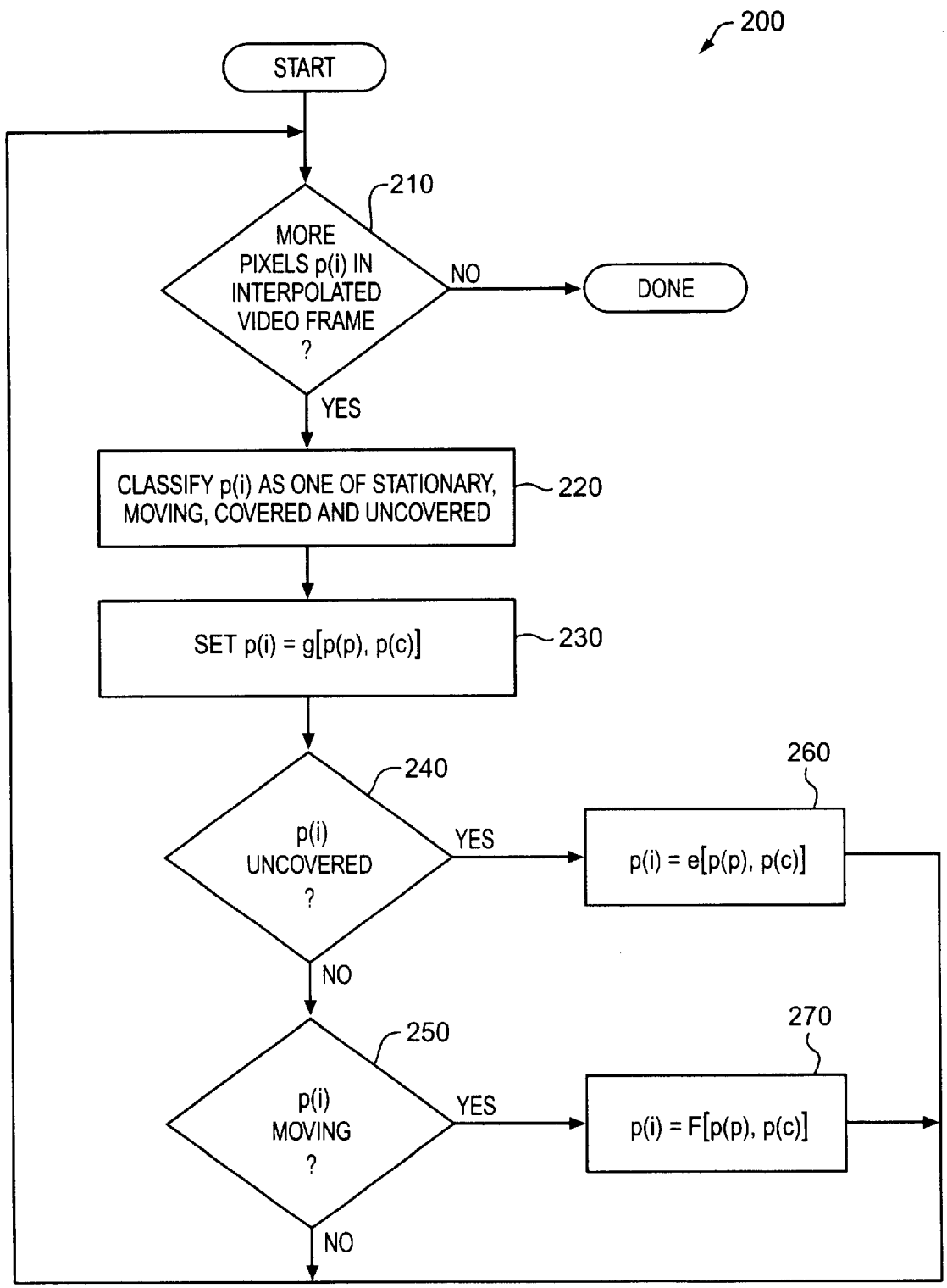
FIG. 2A is a flowchart illustrating one embodiment of a method to implement a frame interpolator in accordance with the present invention.

In one embodiment, state map 182, frame F(t) 105 and frame F(t-1) 106 are applied to rendered 110. Renderer 110 applies processing to these signals as illustrated in FIG. 2A to produce interpolated frame F(I) 108. Frame F(I) 108 is then applied to an error detector 180 to detect and correct errors in the interpolated frame 108. Frame F(I) 108 may then be inserted into the sequence of video frames between frames F(t-1) and F(t). The video sequence may then be displayed on a video display 130, which reproduces the captured video information 155 as displayed video information 132.

Those skilled in the art will appreciate that no motion estimation is used in the illustrated embodiment to produce the interpolated frame F(I) 108. Motion estimation may be computation-intensive and may lead to a greater error rate on interpolated frames. Eliminating or reducing motion estimation from the computation of the interpolated frame F(I) 108 may lead to increased efficiency of the computation. Furthermore, the interpolated video frames may be computed with improved quality over existing techniques by eliminating the visual errors associated with block-based motion estimation. The range of frame rates at which quality interpolated frames may be generated may be extended because the elimination of motion estimation frees additional resources to compute the interpolated frame (thus higher frame rates may be supported).

In one embodiment, error detector 180 classifies interpolated frame 108 as a bad frame if the interpolated frame 108 represents a significant departure from frames F(t) 105, F(t-1) as applied to renderer 110. In one embodiment, a frequency departure criterion is used to classify the frame F(I) as in error or not, and error correction involves eliminating, smoothing, or otherwise processing the most visible edge artifacts (those regions of the image with the highest frequency content) in frame F(I) 108. Correction may be accomplished, for example, by computing an average value for all pixels in the frame and adjusting all pixels in the frame 108 closer to the average value.

Figure 1B:
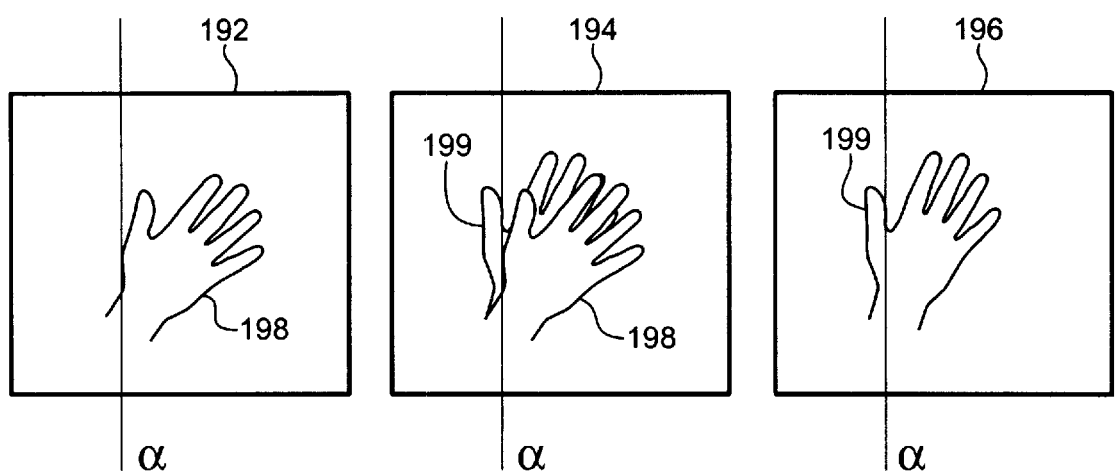
FIG. 1B is an illustration of an example of a possible error frame produced by the embodiment illustrated in FIG. 1A.

FIG. 1B is an illustration of an example of a possible error frame produced by the embodiment illustrated in FIG. 1A. Referring now to FIG. 1B, a previous frame 192 is shown with a moving human hand in a first position 198. A current frame 196 is shown in which the human hand has moved to a second position 199. The first position 198 and second position 199 of the human hand are shown in relation to a reference axis a for the frames to better illustrate their relative positions. Within the interpolated frame 194, an artifact is produced in which both positions of the human hand are represented. Such an artifact may result from application of the embodiment of the rendering method illustrated in FIG. 2A and FIG. 2B. Because of the large number of edges (approximately twice the number) in the interpolated frame 194 relative to the previous frame 192 and current frame 196, the interpolated frame 194 may be classified as being in error.

In one embodiment, Sobel edge detection may be used to compute a binary edge map. The number of edge pixels for the current frame 196, previous frame 192, and interpolated frame 194 are counted. The count of edge pixels is a rough measure of high-frequency content. If the count in the interpolated frame differs substantially from the count in the current 196 and previous 192 frames, the interpolated frame 194 may be classified as bad and correction may be performed on interpolated frame 194 to lessen the perceived effect of the error. Interpolation artifacts may have edges which are faint compared to edges which are a genuine part of the content. In one embodiment, the threshold for generating the binary edge map is set to a low value to account for the faintness of the artifact edges. Also, an increase in the number of edges in the interpolated frame 194 over the count of edges in the previous frame 192 or current frame 196 may in one embodiment be considered more indicative of error artifacts than a decrease in the edge count. An asymmetric decision criterion may be used that favors the error classification of interpolated frames with a greater number of edges than the current frame 196 or previous frame 192. In one embodiment, a five-percent greater edge count in the interpolated frame, or a ten-percent lower edge count in the interpolated frame, comprises a threshold to classify the interpolated frame as a bad frame. Other embodiments may employ other threshold values depending upon the error sensitivity desired and the quality of the frame content.

FIG. 2A is a flowchart illustrating one embodiment 200 of a method to implement a frame interpolator in accordance with the present invention. Embodiment 200 determines the values to assign to the pixels in an interpolated frame. Referring now to FIG. 2A, a test is made at 210 to determine whether there are more pixels p(i) in the interpolated frame to produce. At 220, the pixel p(i) is classified as one of STATIONARY, MOVING, COVERED, and UNCOVERED. At 230, the pixel value is set to a function p(i)=g[p(p), p(c)], where:

p(i) is the pixel in the interpolated frame whose value is set, p(p) is the value of a corresponding pixel in the previous frame (F(t-1) in FIG. 1A), p(c) is the value of a corresponding pixel in the current frame (F(t) in FIG. 1A), and In one embodiment, the function g copies components of the pixel p(p) from the previous frame F(t-1) to components of a corresponding pixel p(i) in the interpolated frame F(I).

For example, in one embodiment in which the pixels of the frames are represented in the RGBI format, the R (red), G (green), and B (Blue) components of the pixel p(p) from the previous frame F(t-1) are copied to a corresponding pixel p(i) in the interpolated frame F(I), while the Intensity (I) component is not copied. For this embodiment, p(i)=p(p). Of course, the invention is not limited in scope in this respect.

At 240, a test is performed to determine whether the pixel p(i) is classified as UNCOVERED. This test may be performed, for example, by checking the entry in the state map corresponding to the pixel p(i). If the pixel p(i) is UNCOVERED, the pixel p(i) is set at 260 to a function e[p(p), p(c)]. In one embodiment, the function e copies identified components of the pixel p(c) from the current frame F(t) to a corresponding pixel p(i) in the interpolated frame F(I). Processing then continues at 210, until each pixel in the interpolated frame F(I) has been assigned a value.

Figure 2B:
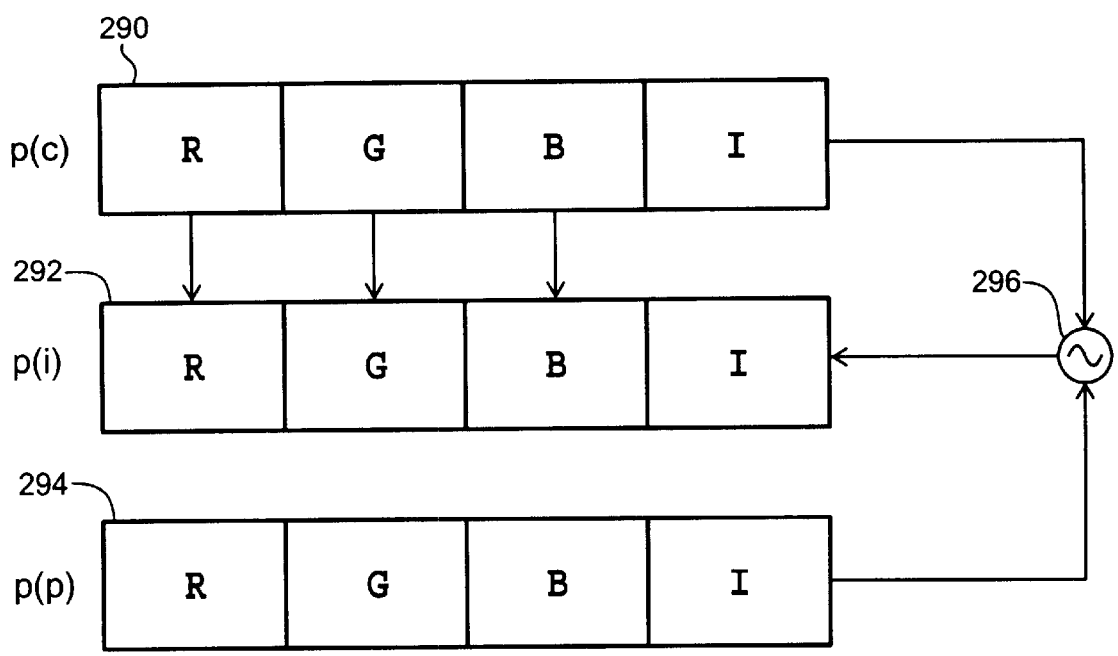
FIG. 2B is an illustration of setting the components of an interpolated pixel produced in accordance with one embodiment of the present invention.

FIG. 2B is an illustration of setting the components of an interpolated pixel produced in accordance with one embodiment of the present invention. Referring now to FIG. 2B, in one embodiment in which the pixels of the frames are represented in the RGBI format, the R (red), G (green), and B (Blue) components of the pixel p(c) 290 from the current frame F(t) are copied to a corresponding pixel p(i) 292 in the interpolated frame F(I), while the Intensity (I) component is computed as a function 296 of the Intensity component of the current pixel 290 and the previous pixel 294. For this embodiment, p(i)=p(c). Of course, the invention is not limited in scope in this regard.

In embodiment 200, no test is performed to determine whether the pixel p(i) is classified as COVERED. This test may be omitted because setting the pixel value to the function p(i)=g[p(p), p(c)] has already been performed at 230. In another embodiment, at 230 the pixel value is set to the function p(i)=e[p(p), p(c)], and at 240, a test is performed to determine whether the pixel p(i) is classified as COVERED. If the pixel p(i) is COVERED, the pixel p(i) is set at 260 to the function g[p(p), p(c)]. No test is performed in this other embodiment to determine whether the pixel p(i) is classified as UNCOVERED. Again, setting the pixel value to the function p(i)=e[p(p), p(c)] has already been performed at 230.

In one embodiment, only certain components of pixels from the corresponding previous, other previous, and current frames are used by the classifier to classify the interpolated pixel. The pixel components used to set the interpolated pixel components are the same pixel components used by the classifier to classify the interpolated pixel, and interpolated pixel components not used to classify the interpolated pixel are set using a function of corresponding non-classified pixel components of the previous and current pixels. For example, if the pixels of the frames are represented in the RGBI format, the R (red), G (green), and B (Blue) components of the pixel p(c) may be used to classify an interpolated pixel, and these components are used to set the corresponding pixel in the interpolated frame F(I). The Intensity (I) component from pixels from the corresponding previous, other previous, and current frames are not used to classify the interpolated pixel, and intensity component of the interpolated pixel is set to the average value of the intensity component of the corresponding previous, other previous, and current pixel.

At 250, a test is performed to determine whether the pixel p(i) is classified as MOVING. This test may be performed, for example, by checking the entry in the state map corresponding to the pixel p(i). If the pixel p(i) is MOVING, the pixel p(i) is set at 270 to a function f[p(p), p(c)]. In one embodiment, the function f computes a weighted average of components of the pixel p(c) from the current frame F(t) with components of a corresponding pixel p(p) in the previous frame F(t-1). For example, in one embodiment in which the pixels of the frames are represented in the RGBI format, the R (red), G (green), and B (Blue) components of the pixel p(c) from the current frame F(t) are averaged with components of the corresponding pixel p(p) in the previous frame F(t-1). In equation form;

$$p(iR)=Cp(cR)+Dp(pR),$$

$$p(iG)=Cp(cG)+Dp(pG),$$

$$p(iB)=Cp(cB)+Dp(pB),$$

where C are D are constants which are functions of the number of interpolated frames N to insert between frames F(t) and F(t-1) and the interpolated frame number n. For example, if two interpolated frames were to be inserted between F(t-1) and F(t), with N=2, the first frame closest in time to F(t-1) would have number n=1 and the second frame closest in time to F(t) would have number n=2. In one embodiment, C=n/(N+1) and D is 1−C. The functions for the constants C and D demonstrate in this embodiment that the weights of the weighted sum used to calculate the interpolated pixel components are proportional to a position of the interpolated frame between the current frame and the previous frame.

One skilled in the art will appreciate that the method of FIG. 2A need not occur in the precise order of illustration to remain in accordance with the present invention. For example, 240 and 260 may occur before 250 and 270. Likewise, the embodiment is provided mostly as an illustration. Many variations of the flowchart illustrated in FIG. 2A are possible in alternative embodiments of the invention.

Figure 3:
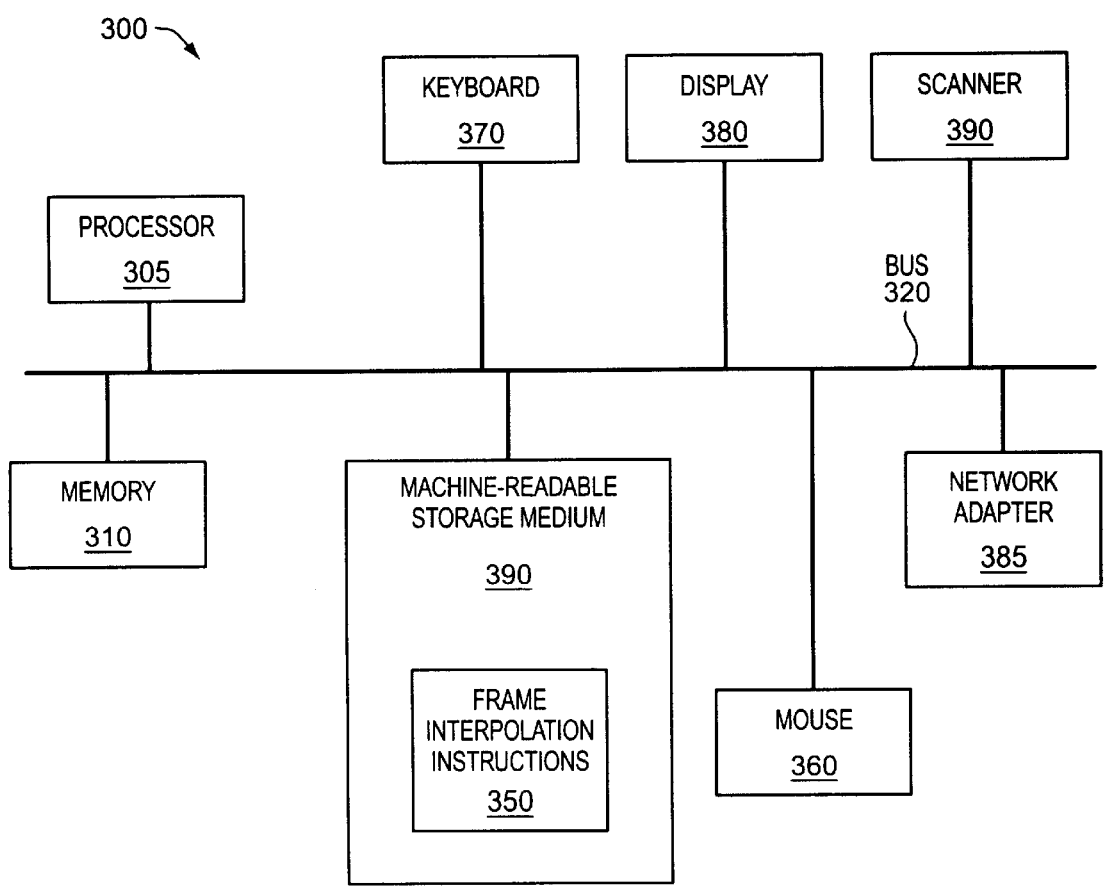
FIG. 3 is a schematic diagram illustrating an embodiment of a data processing device to implement an embodiment of a frame interpolator in accordance with the present invention.

FIG. 3 is a schematic diagram illustrating an embodiment of a data processing device to implement an embodiment of a frame interpolator in accordance with the present invention. Referring now to FIG. 3, embodiment 300 comprises a processor 305 to execute instructions supplied from a bus 320. The executed instructions are stored in a memory 310 from which they are supplied to the processor 305 by the bus 320 for execution. The processor 305 may be implemented using any semiconductor fabrication technology and may execute any instruction set including, but not limited to, instruction sets supported by an Intel Corporation Pentium® processor or otherwise compatible processor. The bus 320 may be implemented using technologies for propagating signals including, but not limited to, electronic and optical conductors. The memory may include random access memory (RAM), read-only memory (ROM), or any other form of memory capable of storing instructions which may then be supplied to the processor 305 by the bus 320 for execution. Embodiment 300 may include a machine-readable storage medium 340 to store sequences of instructions which may be loaded into volatile or non-volatile memory 310 from which they may be supplied to processor 305 for execution. The machine-readable storage medium 340 may include, but is not limited to, a hard drive, a floppy drive, and a CD-ROM or other optical disk.

One skilled in the art will appreciate that in "diskless" devices without mass storage mediums, the machine-readable storage medium 340 may be omitted from the embodiment 300. Instructions, including frame interpolation instructions 350, may be stored in RAM, ROM, or other memory from which instructions may be directly accessed over the bus 320 by the processor 305 for execution.

To perform signal input/output, embodiment 300 comprises a mouse 360, a keyboard 370, a display 380, and a scanner 390, each coupled to the bus 320 for transmitting data so that it may be easily accessed or manipulated by a user. The embodiment 300 further includes a network adapter 385 to couple the embodiment 300 to a network (for dial-up access to the network, a modem may be disposed in alternate embodiments in place of the network adapter 385). Of course, the invention is not limited in scope to this particular embodiment.

In accordance with the present invention, embodiment 300 is shown comprising frame interpolation instructions 350 stored on the machine-readable storage medium 340. The frame interpolation instructions include sequences of instructions for performing the method embodiment illustrated in FIG. 2A, although the invention is not limited in scope in this respect. These instruction sequences are further illustrated in FIG. 4.

Again, the invention is not limited in scope to this particular embodiment. For example, one or more of the classifier, renderer, and error detector could be implemented in hardware or firmware instead of software.

Figure 4:
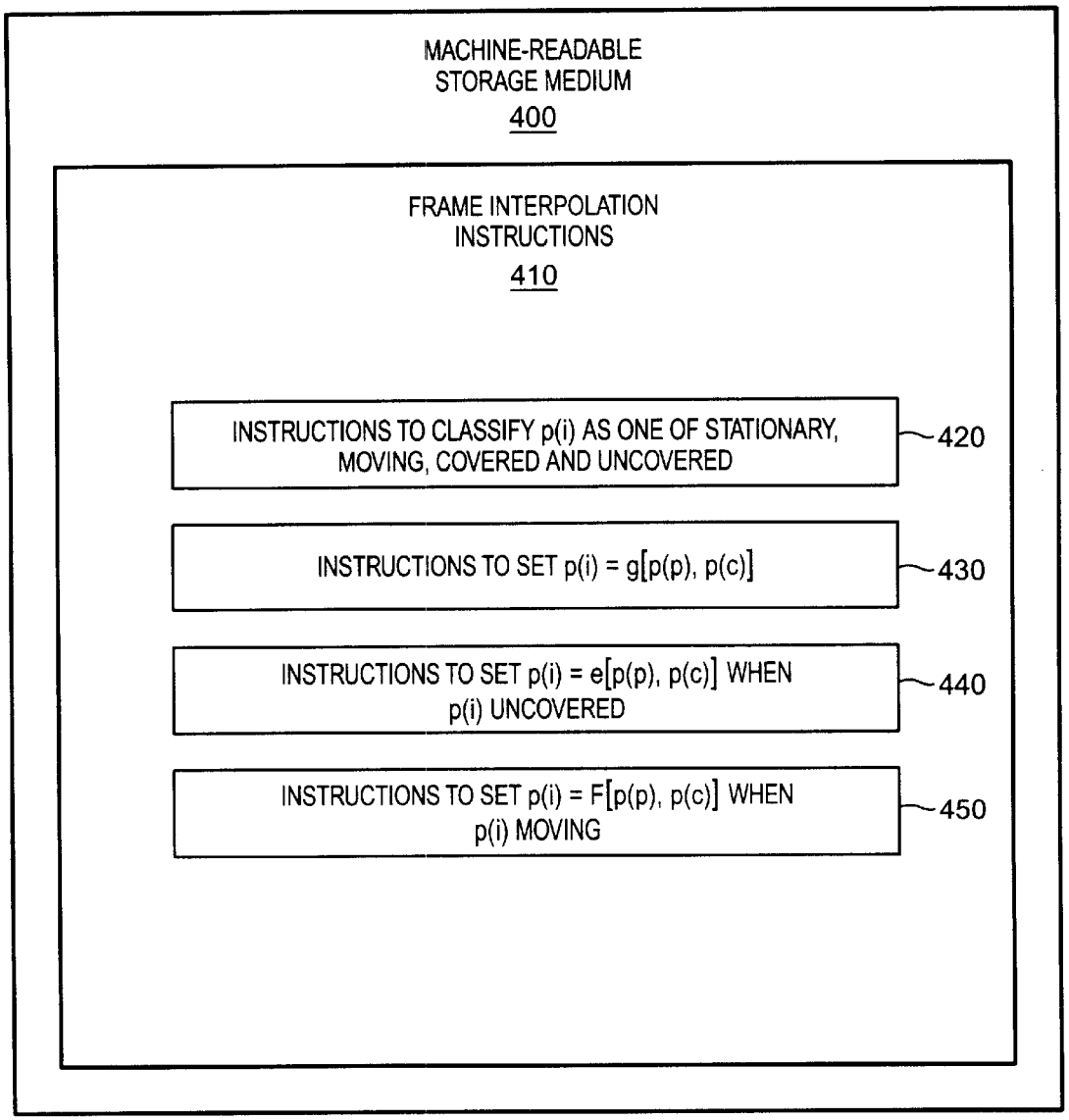
FIG. 4 is a schematic diagram illustrating an embodiment of a machine-readable storage medium comprising a sequence of instructions to implement an embodiment of a frame interpolator in accordance with the present invention.

FIG. 4 is a schematic diagram illustrating an embodiment of a machine-readable storage medium comprising a sequence of instructions to implement an embodiment of a frame interpolator in accordance with the present invention. Referring now to FIG. 4, the machine-readable storage medium 400 may comprise RAM, ROM, a floppy disk, and hard disk, a CD ROM, or any other memory capable of storing sequences of instructions which may be executed by a data processing device such as, for example the device embodiment illustrated in FIG. 3. In this particular embodiment, the instructions comprise sequences of instructions to carry out the method of FIG. 2A, including but not limited to: instructions 420 to classify p(i) as one of STATIONARY, MOVING, COVERED, and UNCOVERED; instructions 430 to set p(i)=g[p(p), p(c)]; instructions 440 to set p(i)=e[p(p), p(c)] if p(i) is UNCOVERED; and instructions 450 to set p(i)=f[p(p), p(c)] if p(i) is MOVING. In accordance with one embodiment described with respect to FIG. 1A, machine-readable storage medium 400 may alternately comprise sequences of instructions to: instructions 420 to classify p(i) as one of STATIONARY, MOVING, COVERED, and UNCOVERED; instructions to set p(i)=e[p(p), p(c)]; instructions 440 to set p(i)=g[p(p), p(c)] if p(i) is COVERED; and instructions 450 to set p(i)=f[p(p), p(c)] if p(i) is MOVING.

Of course, the invention is not limited in scope to this particular embodiment. For example, alternate embodiments could include additional sequences of instructions for performing other functions different from or supplementing the frame interpolator. Furthermore, variations of specific aspects of the embodiments described above are possible as well.

The manners of producing the machine-readable storage medium 400 storing sequences of instructions, such as frame interpolation instructions 410, are well known in the art and to elaborate in detail would merely obscure the description of the present invention.

In summary, embodiments of a frame interpolator have been disclosed with advantages over prior implementations. In one embodiment, each pixel in an interpolated frame is set to a value computed from a corresponding pixel in the current frame and/or a previous frame. Pixels in the interpolated frame is classified as one of STATIONARY, MOVING, COVERED, and UNCOVERED. In one embodiment, the value of components of the pixel in the interpolated frame may be set to the components of a corresponding pixel in the previous frame. This becomes the default value of the pixel in the interpolated frame. If the pixel in uncovered, the value of components of the pixel in the interpolated frame may be further set to the components of a corresponding pixel in the current frame. If the pixel is moving, the value of components of the pixel in the interpolated frame may be set to a function of the components of a corresponding pixel in the previous frame and components of the corresponding pixel in the current frame.

While certain features of the invention have been illustrated as described herein, many modifications, substitutions, changes and equivalents will now occur to those skilled in the art. It is, therefore, to be understood that the appended claims are intended to cover all such embodiments and changes as fall within the true spirit of the invention.

What is claimed is:

1. A method comprising:
    classifying an interpolated pixel of a plurality of interpolated pixels in an interpolated video frame as one of stationary, moving, covered, and uncovered; and
    if the interpolated pixel is classified as moving, setting the interpolated pixel to a weighted sum of a current pixel from a current video frame, the current pixel corresponding to the interpolated pixel in the interpolated video frame, and a previous pixel from a previous video frame, the previous pixel corresponding to the interpolated pixel in the interpolated video frame.

2. The method of claim 1, further comprising:
    if the interpolated pixel is classified as covered, setting components of the interpolated pixel to components of the previous pixel.

3. The method of claim 2 in which setting components of the interpolated pixel to components of the previous pixel further comprises:
    setting interpolated pixel components used to classify the interpolated pixel to corresponding pixel components of the previous pixel;
    setting interpolated pixel components not used to classify the interpolated pixel to a function of corresponding non-classified pixel components of the previous pixel and corresponding non-classified pixel components of the current pixel.

4. The method of claim 1, further comprising:
    if the interpolated pixel is classified as uncovered, setting components of the interpolated pixel to components of the current pixel.

5. The method of claim 4 in which setting components of the interpolated pixel to components of the current pixel further comprises:
    setting interpolated pixel components used to classify the interpolated pixel to corresponding pixel components of the current pixel;
    setting interpolated pixel components not used to classify the interpolated pixel to a function of corresponding non-classified pixel components of the previous pixel and corresponding non-classified pixel components of the current pixel.

6. The method of claim 1, further comprising:
    if the interpolated pixel is classified as stationary, setting components of the interpolated pixel to components of the current pixel.

7. The method of claim 1, further comprising:
    if the interpolated pixel is classified as stationary, setting components of the interpolated pixel to components of the previous pixel.

8. The method of claim 1, wherein the weights of the weighted sum are proportional to a position of the interpolated video frame between the current video frame and the previous video frame.

9. The method of claim 1, further comprising:
    classifying the interpolated video frame as a bad frame if the interpolated video frame significantly departs from the current video frame and the previous video frame; and
    performing error correction on the bad frame.

10. The method of claim 9, wherein classifying the interpolated video frame comprises applying a frequency departure criterion.

11. The method of claim 9, wherein classifying the interpolated video frame comprises using a Sobel edge detector to count the number of edge pixels in the current, previous, and interpolated video frames, and computing a binary edge map based on the count.

12. A data processing device comprising:
    a processor;
    a machine-readable storage medium coupled to the processor by way of a bus, the storage medium storing a sequence of instructions which, when executed by the processor, cause the data processing device to:
        for a plurality of interpolated pixels in an interpolated video frame:
            classify an interpolated pixel of the plurality as one of stationary, moving, covered, and uncovered; and
            if the interpolated pixel is classified as moving, set the interpolated pixel to a weighted sum of a current pixel from a current video frame, the current pixel corresponding to the interpolated pixel in the interpolated video frame, and a previous pixel from a previous video frame, the previous pixel corresponding to the interpolated pixel in the interpolated video frame.

13. The data processing device of claim 12 in which the sequence of instructions further cause the data processing device to:
    set components of the interpolated pixel to components of the previous pixel if the interpolated pixel is classified as covered.

14. The data processing device of claim 13 in which the sequence of instructions, when executed by a data processing device, further cause the data processing device to:
    set the interpolated pixel components used to classify the interpolated pixel to corresponding pixel components of the previous pixel;
    set the interpolated pixel components not used to classify the interpolated pixel to a function of corresponding non-classified pixel components of the previous pixel and corresponding non-classified pixel components of the current pixel.

15. The data processing device of claim 12 in which the sequence of instructions further cause the data processing device to:

set components of the interpolated pixel to components of the current pixel if the interpolated pixel is classified as uncovered.

16. The data processing device of claim 15 in which the sequence of instructions, when executed by a data processing device, further cause the data processing device to:

set the interpolated pixel components used to classify the interpolated pixel to corresponding pixel components of the current pixel;

set the interpolated pixel components not used to classify the interpolated pixel to a function of corresponding non-classified pixel components of the previous pixel and corresponding non-classified pixel components of the current pixel.

17. The data processing device of claim 12 in which the sequence of instructions further cause the data processing device to:

classify the interpolated video frame as a bad frame if the interpolated video frame significantly departs from the current video frame and the previous video frame; and perform error correction on the bad frame.

18. The data processing device of claim 17 in which the sequence of instructions further cause the data processing device to classify the interpolated video frame by applying a frequency departure criterion.

19. The data processing device of claim 17, in which the sequence of instructions further cause the data processing device to classify the interpolated video frame by using a Sobel edge detector to count the number of edge pixels in the current, previous, and interpolated video frames, and compute a binary edge map based on the count.

20. A machine-readable medium having stored thereon a sequence of instructions which, when executed by a data processing device, cause the data processing device to:

for a plurality of interpolated pixels in an interpolated video frame:

classify an interpolated pixel of the plurality as one of stationary, moving, covered, and uncovered; and if the interpolated pixel is classified as moving, set the interpolated pixel to a weighted sum of a current pixel from a current video frame, the current pixel corresponding to the interpolated pixel in the interpolated video frame, and a previous pixel from a previous video frame, the previous pixel corresponding to the interpolated pixel in the interpolated video frame.

21. The machine-readable medium of claim 20 in which the sequence of instructions further cause the data processing device to:

set components of the interpolated pixel to components of the previous pixel if the interpolated pixel is classified as covered.

22. The machine-readable medium of claim 21 in which the sequence of instructions, when executed by a data processing device, further causes the data processing device to:

set the interpolated pixel components used to classify the interpolated pixel to corresponding pixel components of the previous pixel;

set the interpolated pixel components not used to classify the interpolated pixel to a function of corresponding non-classified pixel components of the previous pixel and corresponding non-classified pixel components of the current pixel.

23. The machine-readable medium of claim 20 in which the sequence of instructions further cause the data processing device to:

set components of the interpolated pixel to components of the current pixel if the interpolated pixel is classified as uncovered.

24. The machine-readable medium of claim 23 in which the sequence of instructions, when executed by a data processing device, further causes the data processing device to:

set the interpolated pixel components used to classify the interpolated pixel to corresponding pixel components of the current pixel;

set the interpolated pixel components not used to classify the interpolated pixel to a function of corresponding non-classified pixel components of the previous pixel and corresponding non-classified pixel components of the current pixel.

25. The machine-readable medium of claim 20 in which the sequence of instruction further cause the data processing device to:

classify the interpolated video frame as a bad frame if the interpolated video frame significantly departs from the current video frame and the previous video frame; and perform error correction on the bad frame.

26. The machine-readable medium of claim 25, in which the sequence of instructions further cause the data processing device to classify the interpolated video frame by applying a frequency departure criterion.

27. The machine-readable medium of claim 25, in which the sequence of instructions further cause the data processing device to classify the interpolated video frame by using a Sobel edge detector to count the number of edge pixels in the current, previous, and interpolated video frames, and comprising a binary edge map based on the count.

28. A method comprising:

for a plurality of interpolated pixels in an interpolated video frame:

classifying an interpolated pixel of the plurality as one of stationary, moving, covered, and uncovered;

if the interpolated pixel is classified as moving, setting the interpolated pixel to a weighted sum of a current pixel from a current video frame, the current pixel corresponding to the interpolated pixel in the interpolated video frame, and a previous pixel from a previous video frame, the previous pixel corresponding to the interpolated pixel in the interpolated video frame;

classifying the interpolated video frame as a bad frame if the interpolated video frame significantly departs from the current video frame and the previous video frame; and performing error correction on the bad frame.

29. The method of claim 28, wherein classifying the interpolated video frame comprises applying a frequency departure criterion.

30. The method of claim 28, wherein classifying the interpolated video frame comprises using a Sobel edge detector to count the number of edge pixels in the current, previous, and interpolated video frames, and computing a binary edge map based on the count.

31. The method of claim 28, further comprising:

if the interpolated pixel is classified as covered, setting components of the interpolated pixel to components of the previous pixel.

32. The method of claim 28, further comprising:

if the interpolated pixel is classified as uncovered, setting components of the interpolated pixel to components of the current pixel.

33. The method of claim 28, further comprising:
if the interpolated pixel is classified as stationary, setting components of the interpolated pixel to components of the previous pixel.

34. An apparatus comprising:
a classifier to classify one or more interpolated pixels in an interpolated video frame as one of stationary, moving, covered, and uncovered; and
a renderer to produce the interpolated video frame, and for each of the one or more interpolated pixels classified by the classifier as moving, to set the interpolated pixel to a weighted sum of a current pixel from a current video frame, the current pixel corresponding to the interpolated pixel in the interpolated video frame, and a previous pixel from a previous video frame, the previous pixel corresponding to the interpolated pixel in the interpolated video frame.

35. The apparatus according to claim 34 further comprising:
an error detector to classify the interpolated video frame as a bad frame if the interpolated video frame significantly departs from the current video frame and the previous video frame, and to perform error correction on the bad frame.

36. The apparatus according to claim 35, wherein the error detector classifies the interpolated video frame as a bad frame by applying a frequency departure criterion.

37. The apparatus according to claim 36, wherein the frequency departure criterion comprises a Sobel edge detector to count the number of edge pixels in the current, previous, and interpolated video frames, and to compare a binary edge mao based on the count.

38. The apparatus according to claim 35, the renderer further for each of the pixels classified by the classifier as covered, to set components of the interpolated pixel to components of the previous pixel.

39. The apparatus of claim 35, the renderer further for each of the pixels classified by the classifier as uncovered, to set components of the interpolated pixel to components of the current pixel.

40. The apparatus of claim 35, the renderer further for each of the pixels classified by the classifier as stationary, to set components of the interpolated pixel to components of the previous pixel.

* * * * *